United States Patent [19]
Emmons

[11] Patent Number: 5,243,069

[45] Date of Patent: Sep. 7, 1993

[54] ESTER OF MICHAEL ADDITION HOMOPOLYMERS OF ACRYLIC ACID

[75] Inventor: William D. Emmons, Huntingdon Valley, Pa.

[73] Assignee: Rohm and Haas Company, Philadelphia, Pa.

[21] Appl. No.: 668,352

[22] Filed: Mar. 11, 1991

Related U.S. Application Data

[63] Continuation of Ser. No. 935,463, Nov. 26, 1986, abandoned, which is a continuation of Ser. No. 329,857, Dec. 11, 1981, abandoned.

[51] Int. Cl.$^5$ .............................................. C07C 69/52
[52] U.S. Cl. ................................... 560/224; 560/205; 526/260
[58] Field of Search ................. 560/224, 205; 526/260

[56] References Cited

U.S. PATENT DOCUMENTS 4,267,365 5/1981 Findeisen ............................. 560/205
4,359,564 11/1982 Merritt et al. ........................ 526/260

FOREIGN PATENT DOCUMENTS 1468932 1/1976 Fed. Rep. of Germany .
2800357 7/1979 Fed. Rep. of Germany .
285627 12/1979 Fed. Rep. of Germany .
496892 12/1938 United Kingdom .
1260269 1/1972 United Kingdom .
1600628 10/1981 United Kingdom .

OTHER PUBLICATIONS

Chemical Abstracts, vol. 90 (1979), Ref. No. 205735 to JP-A-78/139.693.
Saegusa, T. et al. Bull. Chem. Soc. Jap. 45(12) 3604-7 1972.

*Primary Examiner*—Paul J. Killos
*Attorney, Agent, or Firm*—Brian W. Stegman

[57] ABSTRACT

There is described the preparation of esters of an acid having the structure $CH_2=CHCO_2(CH_2CH_2CO_2)_nH$ (AOnPA herein) and their use to form polymers, as reactive diluents and modifiers and as crosslinkers. In the above formula n has a value above 0.1. The polymers and the compositions are useful as coatings, binders and adhesives. The compositions are low in volatile components and toxicity.

31 Claims, No Drawings

ESTER OF MICHAEL ADDITION HOMOPOLYMERS OF ACRYLIC ACID

This application is a continuation, of application Ser. No. 935,453, filed Nov. 26, 1986, now abandoned, which is a continuation, of Ser. No. 06/329,857 filed Dec. 11, 1981, now abandoned.

BACKGROUND OF THE INVENTION

1. Field of The Invention

This invention relates to esters of β-acryloxy-propionic acid and other Michael addition homopolymers of acrylic acid, polymers of the esters and applications for the monomers and polymers, such as in formulations for coatings, binders and adhesives. The esters of vinyl addition monomers, many of which are particularly adapted for use as reactive diluents, modifiers and crosslinkers in compositions comprising polymeric materials, are especially useful in systems cured by radiation or autoxidation.

2. Description Of The Prior Art

Preparation of the homopolymer of acrylic acid has been described in Polymer Letters Edition, Volume 14, pages 277-281, 1976; Macromolecules, Volume 7, pages 256-258, 1974; U.S. Pat. No. 3,888,912; and European Patent 3045. The European Patent and U.S. Pat. No. 4,048,259 disclose the use of the homopolymer acid in adhesives and U.S. Pat. Nos. 3,266,930 and 4,048,259 disclose its use in coatings as well. U.S. Pat. No. 3,868,410 teaches the recovery of acrylic acid, an alkanol and an alkyl acrylate from an alkyl ester of the acrylic acid Michael addition homopolymer.

Government implementation of ever more stringent antipollution regulations has generated considerable interest in the development of reactive diluents in coating compositions. Ideally, these diluents are high boiling (i.e. essentially nonvolatile), low viscosity monomers that function as solvents for polymeric constituents during application but can subsequently be induced to polymerize, i.e. can undergo a curing process of some kind, thus becoming an integral part of the final product. Pollution attributable to conventional solvent emissions is thereby reduced or eliminated. There is also a great need, in such coating systems, for multifunctional monomers, with similar physical characteristics, that can serve as crosslinkers capable of providing desirable coating properties, especially mechanical and resistance properties. Unfortunately, many of the reactive diluents and crosslinkers currently in use suffer one or more of the following significant disadvantages: (1) excessive volatility under the conditions of use, (2) less than optimum handling characteristics (i.e., poor solubility in or compatibility with common polymeric materials, crystallinity, high viscosity, etc.) or (3) unacceptable toxicological effects.

The esters of the instant invention are particularly useful as reactive diluents, modifiers and crosslinkers when admixed with other polymeric materials. They are lower in volatility and surprisingly lower in toxicity than acrylate analogues while still retaining desirable viscosity and reactivity properties as compared to the analogues. The esters of the homopolymers of acrylic acid (AOnPA), also referred to as AOnPAtes hereinbelow, are more hydrophobic than the corresponding acrylates and thus more compatible with many conventional polymers and formulations in, for example, coatings, binders and adhesives.

BRIEF SUMMARY OF THE INVENTION

This invention teaches the preparation, properties and uses of addition homopolymers and copolymers of esters of AOnPA and an alcohol. The invention also teaches the preparation, properties and uses of monomers which are esters of AOnPA and a functional alcohol, that is an alcohol other than a $C_1$ to $C_{10}$ alkyl monohydroxylate. AOnPA is an acid having the structure (Formula I)

$$CH_2=CHCO_2(CH_2CH_2CO_2)_nH \qquad (I)$$

wherein the average value of n is 0.1 or greater. In the polymer, the alcohol can be any monohydroxyl alcohol, preferably it has other functionality such as aromaticity, other unsaturation, atoms other than carbon and hydrogen, or even a long hydrocarbon chain such as is common in surfactant molecules. There is taught processes for preparing the polymers, and the use of the polymers in the preparation of coatings, binders, adhesives and rigid plastic articles. The AOnPA ester monomers are esters of a functional alcohol and are useful as monomers in forming homopolymers and copolymers, particularly as modifiers, reactive diluents and crosslinkers when in conjunction with other polymers. Where the alcohol is a polyol and more than one hydroxyl function is esterified by AOnPA, the ester is a vinyl addition crosslinking monomer and (1) other polymers with appropriate functionality can be crosslinked to a polymer network or (2) the AOnPA ester alone can be crosslinked to a polymer network.

DETAILED DESCRIPTION

The α,β-ethylenically unsaturated acids of the ester monomers of this invention, have the structure $$CH_2=CHCO_2(CH_2CH_2CO_2)_nH,$$

wherein the average value of n, n, is 0.1 or greater, preferably between about 0.4 and about 10 and more preferably between about 0.9 and about 5. These acids are prepared conveniently by the Michael addition reaction of acrylic acid to itself, the degree of addition determining the value of n. As is the case with most polymers, the degree of polymerization is conveniently characterized by the average value of n; samples of the polymer will normally have a low degree of polymerization and are thus properly described as oligomers. These oligomers consist of mixtures of individual molecules having the above chemical formula; when individual molecules are being denoted, n must have integral values. When n is 0, the structure is acrylic acid, which is well known as are its esters. The acid molecule where n equals 1 is also known as β-acryloxypropionic acid. This acid, when pure, is represented by Formula I with n=1, for the value of n for every molecule in this sample is 1; thus the average value is also 1. This pure acid is an acid component of certain esters of this invention. Materials other than acrylic acid may be used to prepare the AOnPA which is used to prepare the esters and polymers of this invention, but the preparation starting with acrylic acid is preferred and the use of an AOnPA as the intermediate is also preferred. It is known that samples of acrylic acid spontaneously undergo the Michael addition reaction to a small degree so that, after standing for a protracted period, they contain traces of AOnPA. It is recognized that n is the number average degree of polymerization.

The polymers of this invention are polymers of esters of AOnPA and any alcohol, preferably polymers of the ester monomers of this invention. The ester monomers of this invention are esters of AOnPA and a functional alcohol. A functional alcohol is an alcohol having a functional group such as a functional hydrocarbyl group e.g., an alkylaryl, aralkyl, surfactant-alkyl, ethylenically-unsaturated, or acetylenically-unsaturated group or a non-hydrocarbyl functional group including an ether, ester, halogen, amine, acid, aldehyde, ketone, amide, urea, hydantoin, imide, quaternary ammonium or another hydroxyl group. Preferably the functional alcohol is an ester alcohol or an unsaturated alcohol. A surfactant-alkyl group is a group having twelve or more carbon atoms, preferably 12 to 22 carbon atoms and most preferably a linear chain of 12 to 18 carbon atoms.

One preferred embodiment is that in which the alcohol is also an ester of an $\alpha$, $\beta$-unsaturated acid other than AOnPA, such as, and preferably, acrylic or methacrylic acid. This monomer has two unsaturated groups and thus is adapted to serve as a crosslinking monomer. Ester monomers with another functional group may also serve as a crosslinking monomer. Those with allyl, hydroxyl, vinyl, carboxy, amide (such as alkylol amide or alkoxyalkyl amide and the like urea and hydantoin), amine, halogen, aldehyde, ketone, imide, hydrazide and quaternary ammonium functionality can all serve as crosslinkers (via well known condensation crosslinking, ionic crosslinking as well as other types of addition crosslinking reactions). Preferred other functional groups are hydroxy, carboxy, amine, amide, aldehyde and ketone groups. Such groups can be introduced into AOnPA or AOnPAte homopolymers and copolymers by well known postpolymerization functionalization reactions. Preferred other coreactants useful for reacting with the AOnPAte monomers are polyfunctional epoxides, isocyanates, formaldehyde condensates including melamines, ureas and phenolics, polyamines, polyhydrazides, polythiols, Michael reaction acceptors, titanates and the various silicon-based coreactants, all familiar to those skilled in polymer chemistry.

In another preferred embodiment, the ester is a monoester of AOnPA wherein the alcohol is a polyol; thus the ester has both ethylenic unsaturation and a hydroxyl functional group. The ester may also have other functional groups as in the alcohols above. Thus the ester can be incorporated in an addition polymer by means of the ethylenic group and be crosslinked by means of the hydroxyl or the other functional group. Preferably the polyol is a hydrocarbenyl diol and most preferably the hydrocarbenyl group is ethylenyl or propylenyl.

In another embodiment, the ester is a polyester of AOnPA and a polyol. The polyol can have other functional groups as described in the alcohols above. Being a polyester of an ethylenically-unsaturated acid, it is peculiarly adapted to serve as an addition polymerizable crosslinker. A preferred embodiment is one in which the polyol is a polyhydroxyl substituted hydrocarbon such as ethylene glycol 1,3-butylene glycol, neopentyl glycol,1,4-butanediol, or propylene glycol, and especially where the ester is a diester. In a related embodiment, the ester is an addition product of AOnPA and an epoxide, such as one of the bisphenol A epoxides or an epoxidized oil; the product being a hydroxyl-functional AOnPAte.

In another embodiment the polyol is trimethylol propane and the ester is a diester or, preferably, a triester. A general chemical formula for the vinyl addition monomer (AOnPAte) of this invention is

$$[CH_2=CHCO_2(CH_2CH_2CO_2)_n]_xY$$

wherein the average value of n is 0.1 or greater, Y is the residue of a functional alcohol having z hydroxyl groups, where z is 1 the alcohol having at least one other functional group, z being a positive integer, and the average value of x being greater than 0 but not greater than z. The polymer of this invention is a homopolymer or copolymer of an AOnPAte or of any other ester of AOnPA and an alcohol.

The following comments regarding the chemical and physical properties of monomers and polymers of this invention are not to be regarded as proven facts but are consistent with our understanding of these materials and are pedagogical aids in teaching how these materials achieve certain objects of the invention. In many cases, acrylates and methacrylates offer what appear to be simpler routes to the type of functionality achievable with the AOnPAtes of this invention. However, among the differences, it is found that the AOnPAtes provide harder and more resistant films, as in Examples 27 and 28 below. Further, a trimethylolpropane tris AOnPAte can be used as a sole component topcoat for a soft substrate such as paper and the resulting cured paper is found to be less brittle than the material made with the corresponding acrylic analogue. This result is presumably due to the greater length along the chain between the unsaturated groups in the ester because of the flexibility associated with longer length and of less penetration into the paper substrate by the topcoat because of both the larger size molecule and the greater viscosity of the AOnPAte. The AOnPAtes have lower volatility than the corresponding acrylate and methacrylate materials. Simple methods to decrease the volatility of the acrylics such as by the introduction of alkoxyether units between the alcohol and the acid gives materials with the undesirable properties of the ether units; similar situations exist with other materials such as thioethers, amides and amines. The ether and the other units bind water more strongly than the ester linkage in the AOnPAte, and thus can be expected to be more water sensitive. The polarity or hydrogen bonding capacity which lead to the water swellability also lead to increasing sensitivity to various types of solvents particularly so-called strong solvents. Under appropriate strongly alkaline or strongly acidic conditions AOnPAtes hydrolyze more readily than corresponding acrylate and methacrylate esters. This property has a variety of applications as in processes such as the recycling of paper comprising polymeric adjuncts, the removal of size from fabrics, removal of other temporary coatings from substrates and particularly a papermaking process step known in the art as "broke recovery".

Certain of the physical property differences between the AOnPAtes and the acrylates are advantageous, particularly in industrial practice. An example is the relative softness or ease of liquification of the AOnPAtes. For instance, pentaerythritol tetracrylate is a solid whereas the tetra-AOnPAte is a liquid and thus easily handled and incorporated into liquid formulations.

Mono-AOnPAtes: Among the esters useful herein are those derived from monofunctional alcohols including linear and branches aliphatic alcohols with 1-36 carbon atoms, alicyclic aliphatic alcohols with 3-36 carbon atoms (e.g. cyclohexanol, 3,3,5-trimethylcyclohexanol, dicyclopentenyl alcohol, etc.), hydroxy-functional aromatics (e.g. phenol, naphthol, etc.) and their ethoxylates or propoxylates, alcohols with alkylaryl groups (e.g. benzyl alcohol, 2-phenylethanol, furfurol, etc.), allylic alcohols (e.g. allyl alcohol, 2-methyl-2-propen-1-ol, 2-allyloxyethanol, 2-(2-allyloxyethoxy)ethanol, 2-buten-1-ol, etc.), hydroxyl-functional ethers (e.g. 2-methoxyethanol, 2-ethoxyethanol, 2-butoxyethanol, 2-phenoxyethanol, 2-(2-methoxyethoxy)ethanol, 2-(2-ethoxyethoxy)ethanol, 2-(2-butoxyethoxy) ethanol, 2-(2-hexoxyethoxy)ethanol, the corresponding ethers derived from diethylene glycol, triethylene glycol, tetraethylene glycol, propylene glycol or dipropylene glycol, dicyclopentenyloxyethanol, etc.) hydroxyl-functional esters (e.g. 2-hydroxyethyl acrylate and methacrylate, 2-hydroxypropyl acrylate and methacrylate, 3-hydroxypropyl acrylate and methacrylate, 4-hydroxybutyl acrylate and methacrylate, ethyl 2-hydroxypropanoate, butyl 2-hydroxypropanoate, etc.), hydroxyl-functional acids (e.g. 12-hydroxystearic acid, lactic acid, etc.), hydroxyl-functional aldehydes (e.g. 5-hydroxypentanal, 2,2-dimethyl-3hydroxypropanal, 2-hydroxymethyl-2-methylbutanal, 2-hydroxymethyl-2-methylpentanal, 2-ethyl-2-hydroxymethylhexanal, 3-hydroxy-2,2,4-trimethylpentanal, etc.), hydroxyl-functional ketones (e.g. 4-hydroxy-4-methyl-2-pentanone,- haloalcohols (e.g. 2-chloroethanol, 2-bromo-ethanol, etc), aminoalcohols (e.g. N,N-dimethylethanolamine, N-(2-hydroxyethyl)piperdine, etc.), N-methylolamides, N-methylolureas, N-methylolhydantoins, N-methylolimides, and the like, and N-(2-hydroxyethyl)- or N-(2-hydroxypropyl)-derivatives of amides, ureas, hydantoins, imides, etc.

Also of use are monoesters of common polyols, especially 2-hydroxyethyl β-acryloxypropionate, 2-hydroxypropyl β-acryloxypropionate, and the corresponding esters of higher oligomeric homologues of β-acryloxypropionic acid obtained either by direct esterification with the appropriate diols (e.g. ethylene glycol or propylene glycol) or, preferably, by reaction with the requisite alkylene oxides (e.g. ethylene oxide or propylene oxide) using techniques well known to those skilled in the art. Monoesters of other diols, triols, and higher polyols are similarly useful.

Poly(AOnPAtes): Among the poly vinyl functional esters of use are those derived by esterification of common diols (e.g. ethylene glycol, diethylene glycol, triethylene glycol, tetraethylene glycol, 1,2-propanediol, 1,3-propanediol, dipropylene glycol, 2,2-dimethyl-1,3-propanediol, 2,2,4-trimethyl-1,3-pentanediol, di(hydroxyethyl)- and di(hydroxypropyl)-adipate, azelate, dodecanoate, maleate and fumarate, 1,3-butanediol, 1,4-butanediol, 2-buten-1,4-diol, 2-butyn-1,4-diol, 1,5-pentanediol, 1,6-hexanediol, 1,2-cyclohexanedimethanol, 1,3-cyclohexanedimethanol, 1,4-cyclohexanedimethanol, 1,2-cyclohexanediol, 1,3-cyclohexanediol, 1,4-cycylohexanediol, 1,7-heptanediol, 1,8-octanediol, 2-ethyl-1,3-hexanediol, 1,9-nonanediol, 1,10-decanediol, 1,12-dodecanediol, 4,4'-isopropylidenediphenol and its ethoxylates or propoxylates, 2,2'-thiodiethanol, 3,3'-thiodipropanol, N-methyldiethanolamine, N-ethyldiethanolamine, N-butyldiethanolamine, N-phenyldiethanolamine, N-methylol-, N-(2-hydroxyethyl)-, or N-(2-hydroxypropyl)-derivatives of bisamides, ureas, hydantoins, etc.), triols (e.g. glycerol, 2-ethyl-2-(hydroxymethyl)-1,3-propanediol, 1,1,1-tris(hydroxymethyl)ethane, or their ethoxylates and propoxylates triethanolamine, N-methylol-, N-(2-hydroxyethyl)-, or N-(2-hydroxypropyl)-derivatives of guanamines, melamine, cyanuric acid, etc.), tetrols (e.g. pentaerythritol, N-methylol-, N-(2-hydroxyethyl)-, or N-2(hydroxypropyl)-derivatives of quanamines, melamine, etc.), hexols (e.g. dipentaerythritol, sorbitol, N-methylol-, N-(2-hydroxyethyl)- or N-(2-hydroxypropyl)-derivatives of melamine, etc.), and octols (e.g. tripentaerythritol).

AOnPAs: β-acryloxypropionic acid and higher oligomeric homologues used in this invention can be prepared by any of a variety of methods including (1) addition of acrylic acid to β-propiolactone (2) reaction of acrylic acid or acryloyl chloride with 3-hydroxypropionic acid, or (3) thermal dimerization/oligomerization of acrylic acid either with or without added catalysts. β-acryloxypropionic acid can be used alone or, preferably, admixed in varying proportions with higher oligomeric homologues. For some applications, it is advantageous to employ only the higher oligomeric homologues. In all cases, however, the acid(s) used herein are of commercial grade and therefore contain small quantities of acrylic acid as an impurity unless otherwise specified.

Preparation of AOnPAtes: The esters of this invention can be synthesized by any of the well known procedures described in the literature including direct esterification, transesterification, acrylation of an alcohol via the carboxylic acid chloride, anhydride, or mixed anhydrides, and, of course, other related methodologies.

In direct esterification, the reaction can be effected at temperatures ranging from 20° C. to 200° C., preferably 50° C. to 150° C., at atmospheric, subatmospheric, or superatmospheric pressure, in the presence of one or more acid esterification catalysts of which sulfuric acid, hydrochloric acid, phosphoric acid, boric acid, methanesulfonic acid, benzenesulfonic acid, naphthalenesulfonic acid, para-toluenesulfonic acid, and the like, are illustrative examples. Catalysts are generally employed at levels of 0.1 to 20 mole %, preferably 0.5 to 10 mole %.

It is also desirable to use a vinyl polymerization inhibitor or inhibitors during the reaction, at concentrations ranging from 50 ppm to 10,000 ppm, preferably 100 ppm to 5000 ppm, based on the weight of acid substrate. Among suitable inhibitors are hydroquinone, resorcinol, pyrocatechol, and the like, lower alkoxy-substituted phenolics or lower alkylated alkoxyphenolics having up to ten carbon atoms in the alkyl or alkoxy groups (e.g. monomethyl ether of hydroquinone, monoethyl ether of hydroquinone, mono-t-butyl ether of hydroquinone, etc., alkylated hydroxyanisoles, etc.), phenothiazine, alkyl or aryl phosphites (e.g. triethyl phosphite, triphenyl phosphite, etc.), iodine, and copper salts (e.g. $CuCl_2$, $CuBr_2$ $CuSO_4$, $Cu(PO_3)_2$, $Cu(NO_3)_2$, CuO, etc.). Since the efficiency of some of the cited inhibitors is enhanced by the presence of oxygen, it is advantageous, where appropriate, to sparge air or oxygen through the reaction mixture.

The esterification can be carried out with up to 90 wt. %, preferably up to 50 wt. %, of an inert solvent which will form an azeotrope with water generated during the reaction, thus facilitating removal of the water and displacement of the reaction equilibrium toward product. Examples of such solvents are benzene, toluene, xylene, chlorobenzene, pentane, hexane, heptane, octane, cyclopentane, cyclohexane, methylcyclohexane, dichloromethane, chloroform, carbon tetrachloride, ethylene chloride, trichloroethylene, perchloroethylene, trifluorotrichloroethylene, 3-methyl-2-butanone, methyl tert-butyl ketone, etc.

The ratio of acid to alcohol used in the esterification reaction can vary considerably, ranging, for example from 10:1 through 1:10, on an equivalent basis, with preferred levels ranging from 5:1 to 1:5.

The reaction is continued until either all of the desired hydroxyl groups or all of the desired acid groups have been esterified as measured by standard analytical procedures. Recovery of the ester is then achieved by conventional means generally involving (1) neutralization of the catalyst and, where appropriate, excess unreacted acid, (2) physical separation of the organic phase containing the product ester, and (3) removal of solvent and/or other impurities from the organic phase. As noted with the starting reactants, the product ester will be of commercial grade and should thus contain small quantities of various reaction byproducts. With monofunctional alcohols, the principal impurity will be the corresponding acrylate ester, formed either by esterification of the alcohol with residual acrylic acid in the acid substrate or via reaction with the substrate at the internal ester function. When polyols are employed, the principal impurities will be materials with mixed acrylate and $\beta$-acryloxypropionate groups. In most applications, however, low levels of such impurities are not deleterious.

As noted above, during the esterification of alcohols or polyols with AOnPA, there are formed some acrylate functional products. This is either the result of esterification of the alcohol or polyol with acrylic acid, generated in situ by the thermally induced, acid-catalyzed decomposition of AOnPA and propionyl mers of hydrolysis of AOnPA with the water of esterification, or via direct attack of the alcohol or polyol at the internal ester function of AOnPA. Thus, the propionyl mer distribution in the product will not be the same as the mer distribution in the AOnPA starting material. This phenomenon is implied in Example 1 below in which excess butyl acrylate was found in the preparation of butyl AOnPAte. Additional evidence is provided by the fact that the esterification of dodecanol with distilled AOnPA (less than 1 wt. % AA) consistently affords 4–7 wt % (5–9 mole %) dodecyl acrylate.

The addition polymers comprising AOnPAtes are made by any of the known procedures for vinyl addition polymerization such as bulk polymerization, solution polymerization, suspension polymerization and emulsion polymerization, solution and emulsion polymerization being preferred. Any addition copolymerizable ethylenically unsaturated monomer having a group $H_2C=C<$ or $>C=C<$ may be used for copolymerization, except those comprising primary amine groups or groups which generate primary amines under the polymerization conditions.

Certain preferred polymers of AOnPAtes are copolymers of ethylenically unsaturated acids, generally in the range of about 0.2 to 20%, preferably 3 to 10%, by weight. To obtain water dispersible copolymers, about 2% to 10% acid is usually employed depending on the hydrophilic nature of the other monomers. When water solubility of the copolymer is desired about 5% to 15% or even more acid monomer is used in the copolymer, the higher levels being needed when the remaining monomers are relatively hydrophobic. Examples of the $\alpha, \beta$-ethylenically unsaturated carboxylic acids which are used in forming copolymers of the present invention include acrylic, methacrylic, itaconic, aconitic, crotonic, citraconic, $\beta$-acryloxypropionic, $\beta$-methacryloxypropionic, maleic, fumaric, cinnamic, mesaconic, $\alpha$-chloroacrylic, and the like acids. Mixtures of these acids can also be used.

The unsaturated hydrocarbon monomers which can be used in forming the copolymers of the present invention include ethylene, propylene, isobutene, butylene, amylene, hexylene, butadiene, isoprene and particularly the vinyl aromatic monomers such as styrene, vinyl toluene and other alkyl and dialkylstyrenes. Mixtures of these hydrocarbons can also be used. In some preferred embodiments of the invention, the copolymers contain from about 10% to about 50% by weight of unsaturated hydrocarbon monomer.

Examples of the acrylic acid esters which can be used in forming the copolymers of the present invention include the esters of $C_1-C_{18}$ alcohols such as benzyl, cyclohexyl, isobornyl, methyl, ethyl, propyl, isopropyl, n-butyl, isobutyl, sec-butyl, tert-butyl, and the several amyl, hexyl, octyl (including 2-ethylhexyl), decyl, dodecyl and octadecyl isomers and the like. Acrylic acid esters of alcohols having other functionality, in addition to the alcohol functionally used in forming the ester, can be used in forming the copolymers of this invention, such as hydroxyethyl, hydroxypropyl, methoxyethoxyethyl, ethoxyethoxyethyl, methoxyethyl, ethoxyethyl, and the like acrylates. Mixtures of these esters can be used. Preferably, lower alkyl, i.e. ($C_1-C_8$ esters of acrylic acid and more desirably ($C_1-C_4$) esters of acrylic acid are employed. In some preferred compositions, the copolymers contain from about 1 to 40%, preferably 5 to 20% by weight of an acrylic acid ester, in others the range is 50 to 99%, preferably 80 to 95%.

The methacrylic acid esters which can be used as a monomer in forming the copolymers of the present invention, include methyl, ethyl, propyl, isopropyl, butyl, isobutyl, sec-butyl, tert-butyl, amyl, isoamyl, hexyl, cyclohexyl, 2-ethylbutyl, 2-ethylhexyl, octyl, decyl, lauryl, myristyl, cetyl, stearyl, dicyclopentenyl, dicyclopentenyloxyethyl and the like methacrylates. Methacrylic acid esters of alcohols having other functionality, in addition to the alcohol functionality used in forming the ester, can be used in forming the copolymers of this invention, such as hydroxyethyl, hydroxypropyl, methoxyethoxyethyl, ethoxyethoxyethyl, methoxyethyl, ethoxyethyl, and the like methacrylates. Mixtures of these esters can also be used. Preferably lower alkyl, i.e. ($C_1-C_8$), and more desirably ($C_1-C_4$), esters of methacrylic acid are employed. In some preferred compositions, the copolymers of the invention contain from about 1 to 40%, preferably 5 to 20% by weight of a methacrylic acid ester, in others the range is 50 to 99%, preferably 80 to 95%. Compositions consisting essentially of AOnPAte ester mer units are very useful, particularly where high crosslink density is desired.

Other ethylenically unsaturated monomers can be used in forming the copolymers of the instant invention, such as the esters of vinyl alcohol (including the formic, acetic, propionic, butyric and versatic acid esters; the acetic ester being preferred), acrylonitrile, methacrylonitrile, ethacrylonitrile, phenylacrylonitrile, acrylamide, methacrylamide, ethacrylamide, N-methylol acrylamide, N-monoalkyl and N,N-dialkylacrylamides and methacrylamides (including N-monomethyl, -ethyl, -propyl, -butyl, and N,N-dimethyl, -ethyl, -propyl, -butyl, and the like), the corresponding aromatic amides (such as N-monophenyl-and N,N-diphenyl- acrylamides and methacrylamides), vinyl ethers (such as butyl vinyl ether), N-vinyl lactams (such as N-vinylpyrrolidone), halogenated vinyl compounds (such as vinylidene fluoride, vinyl chloride, and vinylidene chloride), itaconic monoesters and diesters of the alcohols used in forming the acrylic acid esters, supra, allyl and methallyl esters of saturated monocarboxylic acids (such as those used to form esters of vinyl alcohol, supra), vinylthiophene, vinylpyridine, vinylpyrrole, and ethylenically unsaturated monomers containing a quaternary ammonium group (such as methacryloxyethyltrimethylammonium chloride and acryloxyethyltrimethylammonium chloride).

The copolymers of the present invention are preferably prepared by conventional solution or aqueous emulsion polymerization techniques, however, bulk, suspension or other polymerization methods can be used.

In coating applications, it is useful to have an AOnPAte content ranging from about 2 to about 95%, by weight, preferably 5 to 85%.

Of the many monomers that can be used to copolymerize the AOnPAte, those especially preferred include styrene (S), ethyl acrylate (EA), n-butyl acrylate (BA), n-butyl methacrylate (BMA), methyl methacrylate (MMA), acrylonitrile (AN), acrylic acid (AA), and methacrylic acid (MAA).

The solution polymerization may be effected by free radicals obtained from the thermal decomposition of peresters, such as t-butyl peroxypivalate and t-butyl peroctoate. However, any of the conventional free radical initiators can be used, including azonitriles, peroxycarbonates and peroxides. The amount of initiator generally used in ca. 1% to 4% by weight, based on the monomers to be polymerized. However, this amount can be over a broader range, e.g., from about 0.1 to about 10% by weight. Among the useful initiators are the azonitriles such as 2,2'-azobis(isobutyronitrile), 2,2'-azobis(2,4-dimethylvaleronitrile) and 1,1'-azobis(cyclohexanecarbonitrile), the peroxycarbonates such as di(n-propyl) peroxydicarbonate, diisopropyl peroxydicarbonate, dicyclohexyl peroxydicarbonate and di(2-ethylhexyl) peroxydicarbonate, and the peroxides, such as hydrogen peroxide, t-butyl hydroperoxide, benzoyl peroxide, t-butyl peracetate and t-butyl perbenzoate.

As in emulsion polymerization, infra, chain transfer agents can be used to moderate the molecular weight of the copolymer. The same transfer agents and amounts are generally effective.

In the preparation of water soluble or water reducible copolymers, the monomers can be polymerized in a water miscible solvent such as 2-butoxyethanol, 2-ethoxyethyl acetate, isopropanol or isobutanol, and subsequently the acidic groups are neutralized and the system diluted with water. The organic solvent can either be retained as part of the solvent or removed under reduced pressure at a slightly elevated temperature, preferably less than 100° C. The neutralization of the carboxyl functionality, when present in the polymers, can be accomplished with inorganic bases, e.g., ammonia or sodium or potassium hydroxides, or organic bases such as primary secondary or tertiary amines, amino alcohols, and other common bases. Usual precautions should be observed to preclude undesired reactions, e.g., primary amines are not used if aldehydes or ketones are present.

In the preparation of the present copolymers by emulsion polymerization techniques, the emulsifiers or dispersing agents employed and general emulsion polymerization techniques are taught in "Emulsion Polymerization" by F. A. Bovey et al, Interscience Publishers, 1965, and "Emulsion Polymerization" by D. C. Blackley, John Wiley & Sons, publishers, 1975. The polymerizable monomer emulsions can be prepared at a temperature in the range of from about 0° C. to about 100° C. and, if a pressurized reactor is used, even higher temperatures, but intermediate temperatures are generally preferred. Although other free radical initiators are useful, peroxide free-radical catalysts, particularly catalytic systems of the redox type, are recommended. Such systems, as is well known, are combinations of oxidizing agents and reducing agents such as a combination of potassium persulfate and sodium metabisulfite. Suitable peroxide agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Reducing agents include water-soluble thiosulfates, hydrosulfites, tertiary amines, such as triethanolamine and the like, thiourea and salts of metals such as the sulfate salts of metals capable of existing in more than one valence state such as cobalt, iron, nickel, and copper.

A convenient method of preparing the copolymer latex comprises agitating an aqueous suspension or emulsion of the mixture of copolymerizable monomers and redox catalytic combination at room temperature without the application of external heat. The amount of catalyst can vary but the usual range is from 0.01 to 3.0% of the peroxidic agent and the same or lower proportions of the reducing agent based on the weight of monomer. In this way, it is possible to prepare latices which contain as little as 1% and as much as 60% or even more of the resinous copolymers on a weight basis. It is more practical and preferred to produce latices which contain from about 30 to about 50% resin solids.

If desired, a chain-transfer agent is used to moderate the molecular weight of the copolymer obtained by the emulsion copolymerization procedure; the art-known chain-transfer agents may be used, including: long-chain alkyl mercaptans, such as tert-dodecyl mercaptan; alcohols, such as isopropanol, isobutanol, lauryl alcohol, and tert-octyl alcohol; halogenated hydrocarbons, such as carbon tetrachloride, tetrachloroethylene and trichlorobromomethane. Generally, from about 0 to 3%, by weight, based on the weight of the monomer charge, of the chain-transfer agent is used.

Utility

The monoesters of this invention have utility as monomers from which homopolymers and copolymers are easily prepared by common polymerization techniques including bulk, solution, suspension, and emulsion polymerization. They may also be employed as modifiers or reactive diluents in diverse coating applications, cure of the product monomers in such applications being effected, for example, by conventional thermally activated initiators (e.g. peroxides, hydroperoxides, peresters, percarbonates, azo compounds, etc.) or via free radical redox couples, by exposure to ultraviolet light or electron beam radiation, or by chemical reactions well known to those skilled in the art. The polyfunctional esters of this invention can be used as modifiers, crosslinkers, reactive diluents and, where appropriate, even as "resin-like" components of a reactive diluent/resin system.

In the presence of other polymers, such as polyvinyl chloride or a rubber, the polyesters can be reacted to provide cured, crosslinked, insoluble products. Used in plastisols, to provide fluidity, the polyesters crosslink during usual flexing and curing cycles. They are useful in rotocasting and closed mold casting applications as well as in open systems, where their low volatility is advantageous. In rubber compounding, the AOnPAtes act as processing aids, to improve tack and decrease mooney viscosity, and product modifiers to improve final properties such as color, aging resistance, compression set and solvent resistance. Rubbers which are effectively modified by AOnPAtes include nitrile, styrene-butadiene, EPDM, polybutadiene, polyurethane and acrylic rubbers.

A typical polyvinyl chloride thermosol formulation comprises, in parts by weight:

| | |
|---|---|
| dispersion grade poly(vinylchloride) resin | 100 |
| polyAOnPAte | 10-90 |
| ester plasticizer | up to 80 |
| peroxide initiator | 0.25 to 2% of AOnPAte |

Suitable fillers, stabilizers, pigments, fibers etc. may be incorporated.

The ester monomers of this invention, particularly those having more than one AOnPAte function, are especially adapted for use in radiation cured systems. In the application of such systems, radiation capable of causing a chemical change is absorbed to produce curing, usually by means of crosslinking. The radiation includes visible, ultraviolet, far ultraviolet, x-rays, electron beams and so forth. In one embodiment such a system comprises a multi-functional AOnPAte monomer, a photoinitiator and a polymer having residual unsaturation. The system may also contain other monomers including mono-functional AOnPAte esters and could have application wherever clear coatings are used. Other embodiments may comprise the same materials as well as pigments, fillers, other organic polymers including thickeners, surfactants and further specialty materials, such as flattening agents. Coatings cured by electron beams generally are similar but need not comprise a photo-initiator.

The ester monomers are generally used to reduce the viscosity of a monomer polymer system to levels required by the specific application means, such as spraying, dipping, brushing, flow coating, etc. Pentaerythritol tri-AOnPAte and tetra-AOnPAte have a high degree of unsaturation and will give high levels of crosslink density in responding readily to ultraviolet or electron beam radiation. Formulations comprising these monomers are especially adapted for use in printing inks and other coating systems. Trimethylolpropane di- and tri-AOnPAte have a low viscosity thus aiding in producing formulations for applications by procedures requiring good crosslinking and low viscosity. Di-AOnPAtes with modest chains between the two groups, such as an ethylene, propylene, butylene or hexamethylene chain or a 2 to 10 member oxyethylene or oxypropylene chain, are particularly good in supplying low viscosity systems for radiation or other curing as well as in the production of flexible polymeric finished products. These finished products may include materials such as gravure inks, coatings for flexible substrates, metal decorating coatings, particularly those subjected to forming operations after application of the coating, and coatings for paper and vinyl substrates. Preferred polymers for use with AOnPAte ester monomers of this invention in radiation curing are acrylic functional polymers such as epoxyacrylates (e.g., acrylic esters of epichlorohydrin-bisphenol A condensates), polyesterurethanes also terminated with two or more acrylate units, polyether acrylates and polyester acrylates. Typically each of these materials has two or more acrylic terminal groups and a backbone of the type described, varying in length and chemical composition to fit the needs of the specific application. Applications include coating of metals, textiles, wood and overcoating other coatings such as in overprint varnishes and, in many instances, printing inks, Examples include coil coatings, metal decorating coatings, coatings for wood panels, plywood, particle board, floor coverings, vinyl polymers, rubber, paper, and road surfaces. Other examples include potting and coating formulations especially those used to make rigid, insoluble polymers.

In the UV curable formulations photoinitiators initiate the polymerization by steps believed to include the adsorption in the radiation and the photochemical generation of free radicals. Such photoinitiators usually have adsorption in the 300 to 430 nanometer wave length region. Typical examples of these initiators are aromatic ketones such as benzophenone, acetophenone derivatives and alkylbenzoin ethers; optionally in admixture with accelerators such as tertiary amines, and organic halides e.g., tetrachloroethylene.

For ultraviolet light curing systems medium pressure mercury arc lamps are often used as the light source. Lamps are readily available having intensities of 100 watts per inch to 300 watts per inch which will effectively cure coatings of up to about 10 mils thickness. Shorter ultraviolet rays will penetrate and cure only a very thin top layer of a coating which behavior may be desired in some instances. An ultraviolet curing station comprises a power source and control equipment, a cooling system, an efficient reflector, such as an eliptical reflector and a radiation shield with a lamp mounted at a distance about 2 to 4 inches from the substrate which is preferably being conveyed by conveyor means.

In electron beam curing formulations the photo initiator may be omitted and free radicals are generated as a result of electron impacts. An electron generator forms a highly directed beam which is directed onto the formulation which may be pigmented and typically has a thickness up to about 20 mils. The electrons are of very high energy such as 3 to 10 million electron volts although other systems employing somewhat longer exposures and/or thinner coatings may well operate at lower energies such as down to 100,000 electron volts.

The radiation is applied in dosages expressed in rads, the unit of radiation that results in the adsorption of 100 ergs of energy per gram of irradiated material. The common unit is the megarad (Mrad). Commonly about 1/10 to 10 Mrads is employed with about 0.5 to 5 Mrads being preferred. Irradiation can be carried out in air at atmospheric pressure, or under partial or high vacuum conditions, or in an inert gas atmosphere. In some instances air seems to have an inhibitory effect on the crosslinking efficiency.

A flame retardant curable composition is made by employing the bis-AOnPAte of bis(2-hydroxyethyl)tetrachloroterephthalate following the procedures taught in U.S. Pat. No. 4,208,502, herein incorporated by reference. The esterification of the hydroxyethyl compound with AOnPA proceeds much more readily than with acrylic acid or methacrylic acid.

A further embodiment of this invention is in the preparation of rubber comprising radiation curable paint as taught in U.S. Pat. No. 3,719,521, herein incorporated by reference, wherein the acrylate and methacrylate crosslinking agents are replaced by the multi-functional AOnPAte esters of the instant invention to effect a surprising improvement. Also the hydroxyalkyl AOnPAtes are advantageously substituted for the hydroxyalkyl acrylate or methacrylate of the patent.

A further embodiment of this invention is the preparation of foams and rigid thermoset articles. These preparations are exemplified by those described in U.S. Pat. No. 4,180,632, herein incorporated by reference, wherein the acrylate monomers of the patent are replaced by the multi-functional AOnPAtes of the instant invention.

In the following Examples the percent yields are based on the total weight of esters formed, i.e. main products plus ester byproducts.

EXAMPLE 1

Preparation of Butyl Ester of AOnPA

A mixture of 222.4 g. n-butanol (3.0 eq.), 600.0 g. of AOnPA (3.45 eq., n=1: 58%; n=0; <1%; n=2: 26%; n=3: 10%; n=4: 4%; n=5: 2%; inhibited with p-methoxyphenol and triphenyl phosphite having an average n value of 1.39), 30.0 g. p-toluenesulfonic acid monohydrate (1.58 eq.), and 600.0 g. toluene was charged to a 2000 ml. reaction vessel equipped with a thermometer, air ebullator, mechanical stirrer, condenser and Dean-Stark separator. The mixture was heated 3.0 hrs. at reflux (105° C.–115° C.) to give 57 g. of aqueous distillate. The crude product was cooled to 25° C., washed, in portions, with 20% aqueous sodium hydroxide solution, evaporated in vacuo, and filtered through diatomaceous earth to afford 642.0 g. of ester (93% yield) as a fluid, light yellow liquid (Brookfield viscosity: 8 centipoise, 25° C.). The final product contained ca. 4.6% butyl acrylate byproduct.

EXAMPLE 2

Preparation of Dicyclopentyl β-Acryloxypropionate

A 2000 ml. four-necked flask equipped with a thermometer, mechanical stirrer, air ebullator, condenser, and Dean-Stark separator was charged with 29.4 g. purified β-acryloxypropionic acid (0.2 mole, assay: 96%; acrylic acid: 4%; average n is 0.92), 30.0 g. dicyclopentenyl alcohol (0.2 mole, distilled), 1.14 g. p-toluenesulfonic acid monohydrate (0.006 mole, 3 mole %), 50 g. heptene, and 0.009 g. hydroquinone. The Dean-Stark separator was filled with additional heptane (20 ml.) and the reaction mixture was heated to reflux (91° C.). After 2.75 hours, 3.6 g. of water had been collected, the temperature of the mixture reaching 105° C. The crude product was cooled, washed with 5% aqueous sodium hydroxide solution and distilled water, then dried over magnesium sulfate, filtered and evaporated in vacuo to afford 53.0 g. of pale yellow ester (96% yield, Brookfield viscosity: 40 cps, 25° C.) containing ca. 6.5% dicyclopentenyl acrylate byproduct.

EXAMPLE 3

Tetrahydrofurfuryl Ester of AOnPA

A solution of 306.4 g. tetrahydrofurfurol (3 eq.), 600 g. the AOnPA of Example 1 (3.45 eq.), and 30.0 g. p-toluenesulfonic acid monohydrate (0.158 eq.) in 600.0 g. toluene was heated at reflux for 5.0 hrs., conversion reaching 98%. The resultant mixture was then purified as described in Example 1 to afford 730 g. of product (94% yield) with a Brookfield viscosity of 17 cps at 25° C.

EXAMPLES 4

2-Hydroxyethyl Ester of AOnPA

A 1000 ml. glass autoclave equipped with a thermometer, mechanical stirrer, sampling apparatus, pressure relief valve, and gas inlet system was charged with 432.0 AOnPA of Example 1 (2.48 eq.) and 7.95 g. N,N-dimethylbenzylamine (0.59 mole). The mixture was then heated with agitation, to 85° C. The reactor was sealed and ethylene oxide (147.3 g., 3.35 moles) was introduced above the surface of the liquid at such a rate as to maintain a constant pressure of 20 psig and temperature of 85° C. The ethylene oxide feed was complete in 4.0 hrs. The reaction was stirred at that temperature for an additional hour at which point titratable acid was less than 1 wt. %. After the system was vented, residual ethylene oxide was sparged from the reactor affording 548.5 g. of crude product (97% yield), which was then treated with Amberlyst ® 15 ion exchange beads (Rohm and Haas Co.) to remove the amine catalyst and calcium oxide to neutralize unreacted acid. The purified product had a Brookfield viscosity of 46 centipoise at 25° C.

EXAMPLE 5

2-Hydroxypropyl Ester of AOnPA

A 1000 ml. reaction vessel equipped with a thermometer, condenser, and mechanical stirrer was charged with 500.0 g. AOnPA (3.41 eq., 4.6% n=0; 86.6% n=1; 8.7% n=2, and an average n value of 0.97, inhibited with ca. 1000 ppm each phenothiazine, hydroquinone and p-methoxyphenol) 9.2 g. dimethylbenzylamine (0.068 eq., 2 eq. %), and 297.0 g. of propylene oxide (5.12 eq.). The mixture was heated at reflux for 16.0 hrs., the temperature ranging from 36° C. at the onset of the process to 70° C. at its completion. Progress of the reaction was monitored by titrations for residual acidity, the reaction being terminated when the titer decreased below 0.1 meq./g. (98% conversion). The mixture was stripped of volatiles in vacuo to afford 702 g. of crude product which was then treated with Amberlyst 15 ® ion exchange beads (Rohm and Haas Company) to remove the amine catalyst and with calcium oxide to remove unreacted acid, yielding 600 g. of neutral product ester with a Brookfield viscosity of 50 centipoise at 25° C.

EXAMPLE 6

Ethylene Glycol Bis(AOnPAte)

A solution of 232.5 g. ethylene glycol (7.5 eq.), 1458 g. AOnPA (8.38 eq., of Example 1), and 73.0 g. p-toluenesulfonic acid monohydrate (0.384 eq.) in 1400 g. toluene was heated at reflux for 4.0 hrs., conversion reaching 98%. Purification of the resulting mixture afforded 1301 g. of product ester (90% yield) with a Brookfield viscosity of 95 centipoise at 25° C.

EXAMPLE 7

Neopentyl Glycol Bis(AOnPAte)

A solution of 107.0 g. neopentyl glycol (2.06 eq.), 389.0 g. AOnPA, (2.65 eq., 4.6% n=0, 86.6% n=1, 8.7% n=2; inhibited with ca. 1000 ppm each phenothiazine, hydroquinone and p-methoxyphenol), 1.9 g. p-toluenesulfonic acid monohydrate (0.01 eq.), and 500 g. toluene was heated at reflux for 5.0 hrs. Purification of the resulting mixture afforded 301 g. of product ester (79% yield) with a Brookfield viscosity of 55 centipoise at 25° C.

EXAMPLE 8

Diethylene Glycol Bis(AOnPAte)

A solution of 159.0 g. diethylene glycol (3.0 eq.), 600 g. AOnPA (3.45 eq., as Example 1), 30.0 g. p-toluenesulfonic acid monohydrate (0.158 eq.), and 600 g. toluene was heated at reflux for 4.0 hrs., conversion reaching 98%. Purification of the resulting mixture afforded 560 g. of product ester (89% yield) with a Brookfield viscosity of 100 centipoise at 25° C. The acrylate titer of the product was 4.76 meq./g. as measured by mercaptan titration.

EXAMPLE 9

Trimethylolpropane Tris(AOnPAte)

A solution of 402.5 g. trimethylolpropane (9.0 eq.), 1800.0 g. AOnPA (10.35 eq., of Example 1), 90.0 g. p-toluenesulfonic acid monohydrate (0.474 eq.), and 1800 g. toluene was heated at reflux for 5.0 hrs., conversion reaching 97.5%. Purification of the resulting mixture afforded 1725 g. of product ester (95% yield) with a Brookfield viscosity of 480 cps at 25° C. The acrylate titer of the product was 4.59 meq./g. (97% of theory) as measured by mercaptan titration.

When this reaction was repeated using crude $\beta$-acryloxypropionic acid with the composition described in Example 7, there was obtained product ester with a Brookfield viscosity of 265 centipose at 25° C.

EXAMPLE 10

Pentaerythritol Tetra (AOnPAte)

A solution of 102.1 g. pentaerythritol (3.0 eq.), 600.0. AOnPA (3.45 eq., of Example 1), 30.0 g. p-toluenesulfonic acid monohydrate (0.158 eq.) and 600 g. toluene was heated at reflux for 5.0 hrs., conversion reaching 97.5%. Purification of the resulting mixture afforded 504 g. of product ester (89% yield) with a Brookfield viscosity of 1250 centipoise at 25° C.

EXAMPLE 11

Dipentaerythritol Hexa(AOnPAte)

A mixture of 35.9 g. dipentaerythritol (0.85 eq.,), 200 g. AOnPA (1.06 eq., of Example 1), 8.1 g. p-toluenesulfonic acid monohydrate (0.043 eq., 5 mole %), and 200.0 g. toluene was heated at reflux (110° C.-114° C.) for 3.0 hrs. A total of 15.9 ml. water was collected during this period. The mixture was cooled, washed with aqueous sodium hydroxide solution and water, dried over magnesium sulfate, filtered, and evaporated in vacuo to give 151.4 g. of product (84% yield) as a light amber oil, Brookfield viscosity: 1700 centipoise at 25° C., with an acrylate titer of 4.53 meq./g. (97% of theory) as measured by mercaptan titration.

EXAMPLE 12

Ultraviolet Light Induced Cure of Dicyclopentenyl AOnPAte

The monomer of Example 2 (40 wt. %), formulated with Actomer ® X-80 (60 wt. %, Union Carbide Corp.), an acrylated, epoxidized soybean oil (2.8 meq. acrylate per gram), and the photosensitizer diethoxyacetophenone (2 wt. % on total solids), was coated on a glass plate with a No. 30 wire wound rod (wet film thickness: 1.0-1.5 mils.), and irradiated with ultraviolet light in an Ashdee U.V. Curing Oven operated with two 200 watts/in. medium pressure mercury arc lamps and a line speed of 20 ft./min. After 1.0 sec. exposure, the resultant film had toluene extractables of 5.9 wt. % and a Knoop hardness of 1.2. After 4.0 secs. exposure, the Knoop hardness of the film was 2.7. The starting materials were toluene soluble.

EXAMPLE 13

Electron Beam Induced Cure of Coatings Containing 2-Hydroxyethyl AOnPAte

The monomer of Example 4 was blended on an equal wt. basis with an acrylate functional urethane resin, Uvithane ®893 (a product of Thiokol Chemical Co.), the resultant mixture then being coated on sodium chloride discs (0.013 mm. films) and subjected to electron beam radiation (Energy Sciences, Inc. linear cathode unit, 175 KeV, 1 mamp). Similar coatings were prepared with two other monomers routinely used for electron beam cure, phenoxyethyl acrylate (Chemlink ®160, Ware Chemical Co.) and Carbitol ® acrylate (Reactomer RC 20 ®, Thiokol Chemical Co.,), in place of the monomer of this invention. Residual unsaturation in the coating was measured as a function of electron beam dosage, using infrared spectroscopy for the analysis. Results are summarized in Table 1.

'It is apparent from the data that the monomer of this invention provides faster cure than is obtainable with the control monomers.

TABLE 1

| PERCENT RESIDUAL UNSATURATION | | | | | |
|---|---|---|---|---|---|
| Dosage Level (Mrad). | 0.21 | 0.46 | 0.96 | 2.0 | 4.0 |
| Carbitol ® Acrylate | 58 | 17 | 0 | — | — |
| Phenoxyethyl Acrylate | 88 | 61 | 19 | 5 | 4 |
| Monomer of Example 4 | 22 | 4 | 4 | 0 | — |

EXAMPLE 14

Electron Beam Induced Cure of Ethylene Glycol Bis(AOnPAte)

The ethylene glycol bis (AOnPAte) of Example 7 and 1,6-hexanediol diacrylate were rigorously purified by high pressure liquid chromatography and then irradiated on sodium chloride discs (0.013 mm. thick films) as described in Example 13. Successive passes in the beam were used. Residual unsaturation was measured as a function of electron beam dosage using infrared spectroscopy. Results summarized in Table 2 are the average values for two samples.

TABLE 2

| ELECTRON BEAM CURE | | | | | | |
|---|---|---|---|---|---|---|
| Cure Speed | 128 | 128 | 128 | 64 | 32 | 32 | 32 |

TABLE 2-continued

ELECTRON BEAM CURE

| (ft./min.) Number of Passes | 1 | 1 | 1 | 1 | 1 | 2 | 2 |
|---|---|---|---|---|---|---|---|
| Incremental Dose (Mrad.) | 0.17 | 0.17 | 0.17 | 0.33 | 0.66 | 1.33 | 1.33 |
| Cumulative Dose (Mrad.) | 0.17 | 0.34 | 0.51 | 0.84 | 1.50 | 2.83 | 4.16 |
| Pecent Residual Unsaturation | | | | | | | |
| Ethylene Glycol Bis (AOnPAte) | 94 | 75 | 44 | 25 | 18 | 11 | 7 |
| 1,6-Hexanediol Diacrylate | 93 | 87 | 84 | 69 | 27 | 16 | 11 |

Except for the lowest exposure where the difference may be within experimental error, at all exposure levels ethylene glycol bis(AOnPAte) cured faster than 1,6-hexanediol diacrylate.

EXAMPLE 15

Volatility of Acrylates and AOnPAtes

Volatility data on AOnPAte esters and acrylate esters are obtained by boiling point measurements and by measurements of retention time in a gas chromatograph employing columns which reflect the volatility little influenced by the chemical nature of the material. A Varian 3700 gas chromatograph equipped with a flame ionization detector and stainless steel columns of a methyl silicone gum (OV-1) or a phenyl (50%) methyl silicone gum (OV-17) was employed. The acrylates used were the commercially available materials and the AOnPAtes were those described in previous examples; except for the one based on ethanol as the alcohol which was made by the method of Example 1. The retention time is that of the pure compound, acrylate or β-acryloxy propionate, resulting after separation from impurities in the gas chromatograph. The data obtained are presented in Table 10. It is readily seen that the β-acryloxy propionates are far less volatile than the corresponding acrylates; the former have much higher boiling points and greater retention times in the gas chromatograph equipped with the same column and having the same run conditions.

TABLE 3

VOLATILITY DATA

| | Acrylate Ester | | B-Acryloxy-propionate Ester | |
|---|---|---|---|---|
| Alcohol | Boiling Point | Retention Time (min)[1] | Boiling Point | Retention Time (min)[1] |
| Ethanol | 100° C. | 1.13[2] | 70° C. (10 mm): ca. 188°[5] | 2.74[2] |
| n-Butanol | 146°–148° C. | 2.08[2] | 70° C. (1 mm): ca. 235°[5] | 3.97[2] |
| n-Dodecanol | — | 4.08[3] | — | 6.45[3] |
| Dicyclopentenyl-oxyethanol | — | 5.50[4] | — | 9.00[4] |
| Ethylene Glycol | — | 2.28[2] | — | 7.50[2] |
| Neopentyl Glycol | — | 3.35[2] | — | 7.70[2] |

[1]Varian 3700 Gas Chromatograph (F.I.D.) with CDS 111 Data System.
[2]6' × ⅛" ss column; 3% OV-1; Temperature program: 80° C. to 250° C. at 20°/min; helium flow rate: 15 ml/min.
[3]6' × ⅛" ss column; 10% OV-17; Temperature program: 100° C. to 200° C. at 20°/min; helium flow rate: 30 ml/min.
[4]4' × ⅛" ss column; 10% OV-17; Temperature program: 100° C. to 275° C. at 40°/min; helium flow rate: 100 ml/min.
[5]Estimated boiling point at 760 mm obtained with Temperature-Pressure Nomograph (Matheson Coleman & Bell).

EXAMPLE 16

Monomer Cure Response to Ultraviolet Radiation

The monomers of Examples 6 and 9, respectively, formulated with 2 wt. % diethoxyacetophenone, were coated on aluminum panels to a nominal thickness of 0.05 mm. (2 mil.), and irradiated on a U. V. range (PPG Co.) containing two standard medium pressure mercury lamps (80 watts/cm.) with parabolic reflectors. Cure response in air and nitrogen atmospheres, respectively, were rated by pencil hardness and a physical examination of the film surface. Results are presented in Tables 4 and 5 along with data for 1,6-hexanediol diacrylate, 1,10-decanediol diacrylate, and trimethylolpropane triacrylate (TMPTA) controls.

Under both air and nitrogen atmospheres, the monomers of this invention cure more rapidly than the acrylate controls. Furthermore, in the presence of air, the monomers of this invention exhibit a much lower sensitivity to oxygen inhibition effects with regard to surface cure.

TABLE 4

PENCIL HARDNESS

| Atmosphere | Nitrogen | | | | | | | Air | |
|---|---|---|---|---|---|---|---|---|---|
| Monomer Line Speed (ft./min.) | Ex. 6 | 1,6-HDDA | 1,10-DDDA | Ex. 9 | | TMPTA | | Ex. 9 | TMPTA |
| Lamp Passes | 100 | 100 | 100 | 400 | 200 | 400 | 200 | 200 | 200 |
| 1 | — | — | — | >6B | HB | >6B | 3B | 2B | 3B |
| 2 | 5H | 2H | >6B | HB | 2H | >6B | HB | F | B |
| 4 | 6H | 2H | 2B | — | — | — | — | B | B |
| 8 | 6H | 3H | HB | — | — | — | — | HB | H |
| 16 | 6H | 3H | HB | — | — | — | — | — | — |

TABLE 5

Qualitative Surface Cure

| Atmosphere Monomer Line Speed (ft./min.) Lamp Passes | Nitrogen | | | | | | | Air | |
|---|---|---|---|---|---|---|---|---|---|
| | Ex. 6 | 1,6-HDDA | 1,10-DDDA | Ex. 9 | | TMPTA | | Ex. 9 | TMPTA |
| | 100 | 100 | 100 | 400 | 200 | 400 | 200 | 200 | 200 |
| 1 | — | — | — | Sl. Wet | Soft | Wet | Sl. Oily | Sl. Oily | Wet |
| 2 | Hard | Wet | Wet | Sl. Oily | Hard | Oily | Hard | Sl. Oily | Wet |
| 4 | Hard | Oily | Oily | — | — | — | — | Hard | Wet |
| 8 | Hard | Sl. Oily | Sl. Oily | — | — | — | — | Hard | Sl. Oily |
| 16 | Hard | Sl. Oily | Sl. Oily | — | — | — | — | — | — |

EXAMPLE 17

Coating System Based on Trimethylolpropane Tris (AOnPAte)

A mixture of 100.0 g. titanium dioxide (Ti-Pure® R-960, Du Pont), 277.5 g. of a 75 wt. % styrene/25 wt. % 2-methyl-2-n-propyloxazolidinylethyl methacrylate copolymer (63% solids in xylene) described in U.S. patent application Ser. No. 116,743, filed Jan. 30, 1980, herein incorporated by reference, and 122.5 g. urethane grade n-butyl acetate was ground with 100.0 g. Ottawa sand for 0.5 hrs. on a sand mill and then filtered. A portion of this grind (250.0 g.) was formulated with 29.3 g. of the monomer of example 9, 68.4 g. of urethane grade n-butyl acetate, 129.7 g. of urethane grade Cellosolve® acetate, 35.4 g. xylene, and 0.1 g. Baysilone® OF/OR311 (flow aid, a product of Mobay Chemical Co.) to afford an enamel (No. 1) having 32.5 wt. % solids, a pigment to binder ratio of 30/70, and a viscosity (#4, Ford Cup, sec.) of 33. A similar enamel (No. 2) was prepared using 29.3 g. trimethylolpropane triacrylate, 69.5 g. urethane grade n-butyl acetate, 130.8 g. urethane grade Cellosolve® acetate, 36.2 g. xylene, and 0.1 g. Baysilone® OF/OR311; the enamel had a solids of 32.3 wt. %, a pigment to binder ratio of 30/70 and a viscosity (#4 Ford Cup, sec.) of 30. The two enamels were spray applied to Bonderite® 1000 panels and allowed to air dry at 77° F. and 50% relative humidity for 7 days. Final mechanical and resistance properties are provided in Table 6.

TABLE 6

ENAMEL PROPERTIES

| Property[1] | Enamel No. 1 | Enamel No. 2 |
|---|---|---|
| Dry Film Thickness (mils) | 1.4–1.5 | 1.4–1.5 |
| Hardness (KHN) | 9.7 | 12.3 |
| Flexibility (⅛" Mandrel) | Pass | Pass |
| Reverse Impact (in.-lb.) | 120 | 20 |
| Glsoo (20°/60°) | 92/100 | 89/99 |
| Dry Print Res. (2 PSI, 1 Hr., 120° F.) | Light | Light |
| Pencil Hardness | 3H | 3H |
| Chemical Resistance (0.5 Hr. Patch Test) | | |
| 10% Aq. Sodium Hydroxide | 3H | 3H |
| 10% Aq. Acetic Acid | H | 3H |
| Gasoline (Premium Unleaded) | 3H | 3H |
| Xylene | F | F |
| n-Butyl Acetate | B | 4B |

[1]Properties are measured as described in U.S. Pat. No. 4,251,597

Except for some differences in hardness, reverse impact, and chemical resistance, the properties of the two coatings are fairly similar. Thus, the monomer of this invention performs in a manner comparable to that of the corresponding triacrylate. The principal advantage o the monomer of this invention, however, lies in its reduced toxicity. It exhibits a skin sensitivity or Draize rating of less than 1 (slight irritant) whereas trimethylolpropane triacrylate, used as a control in the same sensitivity test, exhibits a Draize rating greater than 4 (moderate irritant).

EXAMPLE 18

Cure of AOnPAtes

Table 7 compares various neat multifunctional acrylate and AOnPAte monomers for their cure response by electron beam (EB) or ultraviolet (UV) irradiation. Cure was quantitatively measured using infrared analysis to follow the disappearance of the reactive double bond at ca. 810 wave numbers and also qualitatively by rubbing the surface with methanol saturated cheese cloth under moderate finger pressure. The table reports the percent conversion of double bonds after exposure to 1 megarad (Mrad) EB irradiation (Energy Science, Inc. model CB 200/30/20,175 Kev) or after 1 pass at 50 m/min under a medium pressure UV lamp operating at 40 watt/cm. (Radiation Polymer Corp. Model QC 1202). It also lists the EB dose needed, or the number of UV passes needed (at 130 m/min. 80 W/cm.), for a thin coating to survive 50 back and forth methanol rubs with no visible damage. Diethoxyacetophenone (DEAP, Upjohn Co.) was used as photoinitiator for UV cure at the levels noted (0.5, 2, or 5%) and the coating was exposed in air, nitrogen, or between air impervious substrates (closed).

The data show clearly and surprisingly that: (1) all the difunctional AOnPAte monomers cure much faster than the hexanediol diacrylate control, (2) similarly, the AOnPA triester of trimethylolpropane and the AOnPA tetraester of pentaerythritrol cure faster than the corresponding acrylic acid multiesters by EB conversion, (3) the tripropyleneglycol diacrylate and the tetraethyleneglycol diacrylate cure more slowly than the AOnPA diester monomers except as determined by IR analysis of EB cure.

The fast cure response is particularly surprising since the concention of acrylate double bonds is lower in the higher molecular weight AOnPA multiesters.

TABLE 7

| | Cure Conversion or Dose Required for Cure | | | | |
|---|---|---|---|---|---|
| | Electron Beam (N$_2$) | | Ultraviolet[1] | | |
| | % Conversion | Dose (Mrads)[2] | Closed[3] | Nitrogen[4] | Air[5] |
| Monomer | at 1 Mrad | for 50 MeOH Rubs | % Conversion | Number of Passes | |
| hexanediol diacrylate (Celanese) | 50 | 0.4 | 2 | 5 | 3 |
| tripropyleneglycol diacrylate (Celanese) | 88 | 0.6 | 27 | 4 | 5 |
| tetraethyleneglycol diacrylate (Celanese) | 95 | 0.4 | 20 | 3 | 3 |
| acryloxyethoxy (AOnPAte) - Ex. 23 | 83 | 0.2 | 52 | 2 | 2 |
| ethylene glycol di (AOnPAte) - Ex. 6 | 88 | 0.2 | 43 | 2 | 2 |
| diethylene glycol di (AOnPAte) - Ex. 8 | 94 | 0.2 | | | |
| neopentyl glycol di (AOnPAte) - Ex. 7 | 84 | 0.2 | | | |
| trimethylolpropane triacrylate (Celanese) | 35 | 0.4 | | | |
| trimethylolpropane tri (AOnPAte) - Ex. 9 | 80 | 0.4 | | | |
| pentaerythritol tri (3.3) acrylate (Celanese) | 30 | over 0.4 | | | |
| pentaerythritol tetra (AOnPAte) - Ex. 10 | 65 | 0.2 | | | |

[1]Closed system is exposed at 50 M/min., 40 W/cm. The open (air or nitrogen) systems are exposed at 130 M/min., 80 W/cm. Substrate is NaCl disc 25 mm. dia. × 5 mm. thick (two for closed system).
[2]Increments of 0.2 Mrads are used. Substrate is 2 mil. polyethylene in both sets of electron beam studies.
[3]0.5% DEAP added to monomer.
[4]2% DEAP added to monomer. Number of UV passes for film to be resistant to 50 methanol rubs.
[5]5% DEAP added to monomer. Number of UV passes for film to be resistant to 50 methanol rubs.

EXAMPLE 19

AOnPAte-containing Coatings

Coating formulations (Table 8) containing equal weights of monomer and of acrylate terminated oligomers were prepared. Free films were made for stress-strain testing by using 5 mil. opening Gardner ® knife drawdowns on decal paper (Dennison Co., 2242), setting the coating by exposure to 0.25 to 0.6 Mrad EB irradiation, cutting these gelled coatings into the appropriate test strips, removing them from the decal paper and finally fully curing each by exposing top and bottom surfaces to 5 Mrad EB irradiation. Coatings for impact resistance and hardness measurements (Table 9) were 8 mil. drawdowns on steel panels cured by one EB pass at a 10 Mrad dose. The tables report the stress-strain data obtained according to ASTM (American Society For Testing Material) D882-79, the falling weight impact resistance by ASTM D2794-69, and the Tukon hardness by ASTM D1474.

The data (Tables 8, 9) show clearly that for all comparable urethane diacrylate formulations, the AOnPA ester films (except the neopentyl glycol diester) have a lower modulus, greater elongation and much greater impact resistance than the acrylate ester films. That these properties are not greatly offset by lower hardness or tensile strength is shown by the work to break data.

It is seen that, in general, the AOnPAte formulations produce films having equal or higher values of tensile strength, elongation and work to break than do the commercial acrylate esters.

The oligomer diacrylates admixed with the monomers of this invention, as described in this Example, are suitable as coatings. The epoxy types are particularly good as coatings for hardboard, as wood lacquers and as paper or print materials. The urethane types are especially useful as vinyl flooring coatings.

The ethylene glycol di(AOnPAte) leads to greater impact resistance than either hexanediol diacrylate or decanediol diacrylate. The improved elongation and impact/hardness balance is surprising because decanediol diacrylate has the same number of connecting carbon and oxygen atoms between functional double bonds as does the di-AOnPA ester. The difference in the so-called "toughness index", the product of the hardness (KHN) and reverse impact resistance (in.-lbs.), is particularly large.

TABLE 8

Stress-Strain Properties of Electron Beam Cured Coatings
(3 mil. films; values are average of five replicate determinations)

| Monomer (as in Example 18) | 50% Oligomer | Tensile[2] Strength | Young's[1] Modulus | Work-to Break[2] | Elongation % |
|---|---|---|---|---|---|
| pentaerythritol tri(3.3)-acrylate | Shell Co. | 2.3 | 420 | — | 0.6 |
| pentaerythritol tetra (AOnPAte) | Epocryl 370 ® epoxy diacrylate | 6.4 | 420 | — | 2.0 |
| trimethylolpropane triacrylate | | too brittle to test | | | |
| trimethylolpropane tri (AOnPAte) | | 4.9 | 390 | 48 | 1.6 |
| hexanediol diacrylate | | 0.5 | 320 | 1 | 0.2 |
| tripropylene glycol diacrylate | | 5.9 | 430 | 41 | 1.7 |
| ethylene glycol di (AOnPAte) | | 6.2 | 390 | 68 | 1.8 |
| diethylene glycol di (AOnPAte) | | 4.9 | 370 | 48 | 1.5 |
| neopentyl glycol di (AOnPAte) | | 2.8 | 280 | 19 | 0.9 |
| acryloxyethoxy (AOnPAte) | | 6.3 | 290 | 86 | 2.3 |
| hexanediol diacrylate | Witco Chem. Co. Castomer U0100 ® urethane diacrylate | 2.3 | 98 | 59 | 3.9 |
| tripropylene glycol diacrylate | | 1.9 | 80 | — | 9.8 |
| ethylene glycol di (AOnPAte) | | 1.8 | 64 | 260 | 18.0 |
| acryloxyethoxy (AOnPAte) | | 2.0 | 63 | 146 | 9.3 |
| hexanediol diacrylate | Thiokol Chem. Co. Uvithane 788 ® urethane | 4.7 | 210 | — | 3.1 |
| tripropylene glycol diacrylate | | 4.1 | 180 | 170 | 5.4 |
| ethylene glycol di (AOnPAte) | | 3.0 | 130 | 310 | 11.0 |

TABLE 8-continued

Stress-Strain Properties of Electron Beam Cured Coatings
(3 mil. films; values are average of five replicate determinations)

| Monomer (as in Example 18) | 50% Oligomer | Tensile[2] Strength | Young's[1] Modulus | Work-to Break[2] | Elongation % |
|---|---|---|---|---|---|
| diethylene glycol di (AOnPAte) | urethane diacrylate | 2.7 | 83 | 350 | 15.0 |
| neopentyl glycol (AOnPAte) | | 4.7 | 260 | 110 | 3.4 |
| acryloxyethyl (AOnPAte) | | 4.4 | 175 | 150 | 4.6 |
| hexanediol diacrylate | Thiokol Chem. Co. Uvithane 783 ® urethane diacrylate | 4.0 | 270 | — | 2.1 |
| tripropylene glycol diacrylate | | 4.3 | 260 | 200 | 3.9 |
| ethylene glycol di (AOnPAte) | | | | | |
| diethylene glycol di (AOnPAte) | | 2.6 | 60 | 410 | 2.2 |
| neopentyl glycol di (AOnPAte) | | 5.1 | 310 | 130 | 3.4 |
| acryloxyethoxy (AOnPAte) | | 4.7 | 200 | 145 | 4.1 |

[1] In meganewtons per square meter ($MN/m^2$)
[2] In kilonewtons per square meter ($KN/m^2$)

TABLE 9

Hardness and Impact Resistance of EB Cured Coatings
(8 mil. coatings on steel)

| Monomer[1] and Weight % | Coating Formulation | Oligomer (Balance) | Tukon[1] Hardness[2] (KHN) | Impact Resistance[3,2] (in.-lb.) direct | reverse |
|---|---|---|---|---|---|
| hexanediol diacrylate | 80 | Shell Co. Epocryl 370 ® epoxy diacrylate | 10.9 | 25 | 2 |
| | 50 | | 14.4 | 25 | 3 |
| | 20 | | 17.2 | 25 | 5 |
| decanediol diacrylate | 80 | | 5.7 | 34 | 5 |
| (Sartomer Chemical | 50 | | 14.2 | 28 | 7 |
| Co. SR287) | 20 | | 13.7 | 28 | 6 |
| ethylene glycol di- | 80 | | 10.9 | 38 | 19 |
| (AOnPAte) (Example 6) | 50 | | 15.2 | 36 | 11 |
| | 20 | | 18.0 | 25 | 9 |
| hexanediol diacrylate | 80 | Thiokol Chem. Co. Uvithane 788 ® urethane diacrylate | 13.4 | 25 | 3 |
| | 50 | | 10.9 | 39 | 9 |
| | 20 | | 8.2 | ca. 43 | 19 |
| decanediol diacrylate | 80 | | 4.7 | 45 | 13 |
| | 50 | | 5.3 | ca. 65 | 39 |
| | 20 | | 5.6 | 45 | 13 |
| ethylene glycol di- | 80 | | 9.6 | 78 | 45 |
| (AOnPAte) (Example 6) | 50 | | 7.7 | 78 | 45 |
| | 20 | | 7.9 | 85 | 79 |

[1] See Table 7 except for decanediol diacrylate
[2] Average of two measurements.
[3] On 25 mil. steel panels at 77° F. and 50% relative humidity employing a ½ inch diameter indenter and a 9/16" diameter die.

EXAMPLE 20

Phenyl AOnPAte

A solution of 141.2 g. phenol (1.4 eq.), 300.0 g. AOnPA (1.725 eq., of Example 1), and 8.2 g. of a sulfuric acid/boric acid mixture (50/50 wt. %) in 300.0 g. toluene was heated at reflux for 6.0 hrs., conversion reaching 95%. Purification of the resulting mixture afforded 311.0 g. of product ester (87% yield) with a Brookfield Viscosity of 93 centipoise at 25° C.

EXAMPLE 21

Pentaerythritol Bis- and Tris (AOnPAte)s

A solution of 150.0 g. pentaerythritol (4.4 eq.), 550.0 g. AOnPA (3.16 eq., of Example 1), 30.0 g. p-toluenesulfonic acid monohydrate (0.16 eq.), and 500.0 g. toluene was heated at reflux for 4.0 hrs., conversion reaching 87%. Purification of the resulting mixture afforded 466.0 g. of product ester (80% yield) with an average functionalization of 2.5 hydroxy groups and Brookfield Viscosity of 3100 centipoise at 25° C.

In the like manner, partially esterified products were derived from trimethylolpropane and glycerol. This preparation is applicable to other polyols including other diols, triols, tetrols, etc.

EXAMPLE 22

3-Phenoxy-1,2-propanediol Bis(AOnPAte)

A solution of 150.2 g. phenyl glycidyl ether (1.0 eq.), 200.0 g. AOnPA (1.15 eq., of Example 1), 200.0 g. toluene, 4.0 g. tetrapropylammonium bromide (0.015 eq.), and 1.0 g. phenothiazine was heated at reflux for 6.0 hours. Conversion, measured by residual oxirane titer, was ca. 93%. Upon cooling, the reactor was charged with 186.0 g. of the AOnPA (1.07 eq.), 150.0 g. toluene, and 10.0 g. p-toluenesulfonic acid monohydrate (0.05 eq.). The mixture was again heated at reflux. After 6.0 hrs., conversion was 90%. The product was extracted with ether and purified by washing. It had an acrylate titer of 3.8 meq./g. (theory: 4.17 meq./g.) and Brookfield viscosity of 230 centipoise at 25° C.

EXAMPLE 23

Monoacrylate/Mono-AOnPAte of Ethylene Glycol
(primarily 2-Acryloxyethyl β-Acryloxypropionate)

A solution of 348.3 g. 2-hydroxyethyl acrylate (3.0 eq.), 600.0 g. AOnPA (3.45 eq., of Example 1), and 20.0 g. p-toluene-sulfonic acid monohydrate (0.105 eq.) in 600.0 g. toluene was heated at reflux for 5.0 hrs., conversion reaching 98%. Purification of the resulting mixture gave 742.0 g. of product ester (91% yield) with a Brookfield Viscosity of 26 centipoise at 25° C.

EXAMPLE 24

2,2-Dimethyl-3-oxopropyl Ester of AOnPA

A 200 ml. four-necked flask equipped with a nitrogen ebullator, thermometer, mechanical stirrer, condenser and Dean-Stark separator was charged with 10.2 g. (0.1 mole) hydroxypivaldehyde dimer and 50 g. toluene. The mixture was heated at reflux for 10 minutes to thermally crack the dimer and was then cooled to 80° C. To the mixture was added 20 g. of AOnPA (0.14 moles, 86.6% n=1; 4.6% n=0, 8.7% n=2; inhibited with ca. 1000 ppm each phenothiazine, hydroquinone, and p-methoxyphenol), and 0.7 g. p-toluenesulfonic acid monohydrate (0.0037 mole). The resultant solution was heated at reflux for 70 minutes to afford ca. 2 ml. of aqueous distillate. After washing the reaction mixture with a saturated aqueous sodium bicarbonate solution and a saturated aqueous sodium chloride solution, drying it over anhydrous magnesium sulfate, and evaporating the solvent in vacuo, there was obtained 21.4 g. of product (94% yield) as a fluid pale yellow liquid. NMR ($CDCl_3$): 9.62 δ (s, 1H, —CHO); 5.73-6.67 δ (m, 3H, —CH=$CH_2$); 4.43 δ (t, 2H, —$OCH_2CH_2CO_2$—); 4.2 δ (s, 2H, —$OCH_2C(CH_3)_2$CHO); 2.67 δ (t, 2H, —$OCH_2CH_2CO_2$—); and 1.12 δ (s, 6H, —$C(CH_3)_2$-CHO).

EXAMPLE 25

Tripentaerythritol Octa(AOnPAte)

A mixture of 93.1 g. tripentaerythritol (2.0 eq.), 487.5 g. AOnPA (2.5 eq., of Example 1), 19.0 g. p-toluene-sulfonic acid monohydrate (0.10 eq., 5 mole %), 0.9 g. hydroquinone (1000 ppm on reaction mixture), and 100.0 g. toluene was heated at reflux (116°-133° C.) for 6.5 hrs. A total of 36 ml. of water was collected during this period. The mixture was cooled, washed with aqueous sodium hydroxide solution and water, dried over magnesium sulfate, filtered, and evaporated in vacuo to give 335 g. of product (73% yield) as a brown oil, Brookfield viscosity 6900 cps at 25° C., with an acrylate titer of 4.97 meq./g. as measured by mercaptan titrations.

EXAMPLE 26

1,3-Butylene Glycol Bis (AOnPAte)

A solution of 135.2 g. 1,3-butylene glycol (3.0 eq.), 600.0 g. AOnPA (3.45 eq., of Example 1), 15.0 g. p-toluenesulfonic acid monohydrate (0.079 eq.), and 600.0 g. toluene was heated at reflux for 5.0 hrs. with removal of water by azeotropic distillation. Purification of the resulting mixture afforded 550 g. of product ester (90.5% yield) with a Brookfield viscosity of 97 centipoise (25° C.).

EXAMPLE 27

Polymer Emulsion Containing 2-Hydroxyethyl AOnPAte and a Coating Composition Prepared Therefrom A styrene acrylic polymer containing 21.7 wt. % 2-hydroxyethyl AOnPAte of Example 4 and 6 wt. % methacrylic acid was prepared by a conventional emulsion polymerization process utilizing Wayfos® M-60 (Philip A. Hunt Chemical Corp.) and Triton® X-405 (Rohm and Haas Company, Inc.) as surfactants and a mercaptan chain transfer agent. The resulting polymer emulsion, A, had a solids content of 36.8%, a pH of 6.3, and a viscosity of 90 centipoise. A was neutralized to pH 7.5-8.0 with dimethylaminoethanol and mixed with Cymel® 325 (melamine resin, American Cyanamid Co.) in a 75/25 (w/w) ratio (emulsion/melamine resin). Clear films cast from this mixture were cured at 250° F. for varying periods of time. In the accompanying table, the properties of the resulting films are compared with analogous films prepared from a similar emulsion polymer, B, containing an equimolar quantity of 2-hydroxyethyl methacrylate, thus having the same hydroxyl number. Polymer A cures more rapidly and provides a harder, more solvent resistant film than the control polymer, B, containing 2-hydroxyethyl methacrylate.

TABLE 11

| | | Hydroxyl-Functional Polymer/Cymel ® 325 (75/25) Clear Film Properties[1] | | | | | | |
|---|---|---|---|---|---|---|---|---|
| | | | | | | | Solvent Resistance[2] | |
| | | Hardness | | | | Cellosolve ® | | |
| Polymer Component | Cure Time (min.) | KHN | Pencil | Direct Impact (in.-lbs.) | Mandrel Flex | Xylene | Acetate | Gasoline |
| A | 10 | 5.7 | 2H | 10 | 2" | 6B | 6B | 2H |
| A | 20 | 12.5 | 4H | 12 | 2" | H | 6B | 4H |
| A | 30 | 13.5 | 4H | 24 | 1¼" | 4H | 3H | 4H |
| B | 10 | 1.3 | H | 12 | 1¼" | 6B | 6B | 6B |
| B | 20 | 10.6 | 4H | 36 | 1" | F | 6B | HB |
| B | 30 | 11.0 | 4H | 70 | 1" | 4H | 'F | F |

[1]1.5 mil films.
[2]Pencil hardness after exposure of film to solvent for 0.25 hr.

EXAMPLE 28

Solution Polymer Containing 2-Hydroxyethyl AOnPAte

A styrene acrylic solution polymer containing 30.4 wt. % 2-hydroxyethyl AOnPAte of Example 4 was prepared by conventional free radical polymerization in methyl amyl ketone as solvent and employing a mercaptan chain transfer agent. The resulting polymer solution, A, had a solids content of 72.7% and a viscosity of 44,250 centipoise. Solution A was mixed with Cymel 325 (melamine resin, American Cyanamid Co.) in a 75/25 (w/w) ratio (polymer/melamine resin). Clear films cast from this mixture were cured at 250° F. for varying periods of time and the properties of the resulting films compared with analogous films prepared from a similar solution polymer, B, containing an equimolar quantity of 2-hydroxyethyl methacrylate. The data shown in the accompanying table indicate that polymer A cures more rapidly and affords a harder, more solvent resistant film than the control, polymer B, containing 2-hydroxyethyl methacrylate. The Tg values of A and B were −10° and −6° C. and the number average molecular weights were 3100 and 2500, respectively.

TABLE 12

| Polymer Component | Cure Time (min.) | Hardness | | Direct Impact (in.-lbs.) | Mandrel Flex | Solvent Resistance[2] | | |
|---|---|---|---|---|---|---|---|---|
| | | KHN | Pencil | | | Xylene | C.A.[3] | Gasoline |
| A | 10 | 15.5 | 6H | 90 | 1" | 6H | 4H | 6H |
| A | 20 | 18.0 | 6H | 60 | 7/16" | 6H | 6H | 6H |
| A | 30 | 19.0 | 7H | 70 | 1" | 7H | 7H | 7H |
| B | 10 | 3.7 | 2H | 18 | 1" | 2B | 6B | 6B |
| B | 20 | 12.0 | 4H | 100 | 1" | B | HB | 4H |
| B | 30 | 12.3 | 5H | 90 | 3/16" | 2H | F | 4H |

Clear Film Properties
Hydroxyl-Functional Polymer/Cymel ® 325 (75/25)

[1] 1.5 mil. film.
[2] Pencil hardness after exposure of film to solvent for 0.25 hr.
[3] Cellosolve acetate ®.

EXAMPLE 29

(AOnPAte) of a Dodecyl Alcohol/Tetradecyl Alcohol Ethoxylate

A solution of 479.2 g. (0.4 eq.) of Macol LA-23 (mixed ethoxylates of dodecyl alcohol and tetradecyl alcohol with an average of 23 ethyleneoxy groups per mole; a product of Mazer Chemicals), 120.0 g. AOnPA (0.69 eq., of Example 1), and 4.0 g. sulfuric acid (0.08 eq.) in 500.0 g. toluene was heated at reflux for 5.0 hrs. with removal of water by azeotropic distillation. Purification of the resulting mixture afforded 510 g. of product ester (94% yield), as a waxy offwhite solid.

EXAMPLE 30

Esterification of 1-Dodecanol with AOnPA

A solution of 1.86 g. 1-dodecanol (0.01 eq.), 10.8 g. AOnPA (1.0 eq.; n=0: 33 wt. %; n=1: 67 wt. %; average value of n is 0.5, inhibited with 400 ppm MEHQ), and 0.02 g. p-toluenesulfonic acid monohydrate in 10 ml. of 50:50 (w/w) heptane/toluene was heated at reflux for 2.5 hrs. with azeotropic removal of water. Conversion, based on 1-dodecanol, reached 99%. After purification, the product was analyzed by gas-liquid chromatography and found to contain 84.2 wt. % dodecyl β-acryloxypropionate and 15.2 wt. % dodecyl acrylate. These data indicate the substantially greater reactivity of β-acryloxypropionic acid compared with acrylic acid in direct esterifications.

EXAMPLE 31

2-Allyloxyethyl AOnPAte

A solution of 51.1 g. 2-allyloxyethanol (0.5 eq.), 150.0 g. AOnPA (0.75 eq., n=1: 28.6 wt. %; n=2: 23.8 wt. %; n=3: 17.9 wt. %, n=4: 13.1 wt. %, n=5: 9.5 wt. %, and n=6: 7.1 wt. %; average value of n is 2.13), 10.0 g. p-toluenesulfonic acid monohydrate (0.053 eq.), and 300 g. toluene was heated at reflux for 1.5 hrs. Purification of the resulting mixture afforded 120.0 g. of product ester (81% yield) with Brookfield viscosity of 20 centipoise (25° C.).

EXAMPLE 32

Trimethylolpropane Tris (AOnPAte)

A solution of 268.4 g. trimethylolpropane (6.0 eq.), 677.2 g. AOnPA (6.6 eq.; n=0: 46.2 wt. %, n=1: 30.2 wt. %, n=2: 14.6 wt. %; n=3: 5.6 wt. %, n=4: 3.4 wt. %; n=0.465), 30.0 g. p-toluenesulfonic acid monohydrate (0.16 eq.), and 700.0 g. toluene was heated at reflux for 4.0 hrs., conversion reaching 98.0%. Purification of the resulting mixture afforded 680 g. of product ester (88% yield) with Brookfield viscosity of 195 centipoise at 25° C.

We claim:

1. A composition comprising the esterification product of a mixture of beta-acryloxypropionic acid and higher oligomeric homologues of said acid with a functional alcohol, said functional alcohol being an alcohol other than a ($C_1$-$C_{10}$) alkyl monohydroxylate, said product liquid at room temperature.

2. The composition of claim 1 wherein the functional alcohol is a polyol.

3. The composition of claim 1 wherein the functional alcohol is a monohydroxyl alcohol.

4. The composition of claim 1 wherein the functional alcohol has a functional hydrocarbyl group.

5. The composition of claim 1 wherein the functional alcohol is a surfactant-alkyl, aryl, alkylaryl, aralkyl, ethenylenically-unsaturated, acetylenically-unsaturated, ether, ester, acid, aldehyde, ketone, amide, urea, hydantoin, imide, quaternary ammonium, halogen or amine alcohol.

6. The composition of claim 1 wherein the functional alcohol is an ester of an alpha, beta-unsaturated acid where the acid is not a mixture of beta-acryloxypropionic acid and higher oligomeric homologues of said acid.

7. The composition of claim 6 wherein the alpha, beta-unsaturated acid is acrylic or methacrylic acid.

8. The composition of claim 1 wherein the esterification product is a monoester and the functional alcohol a polyol.

9. The composition of claim 8 wherein the polyol is a hydrocarbenyl diol.

10. The composition of claim 9 wherein the hydrocarbenyl diol is ethylenyl or propylenyl.

11. The composition of claim 1 wherein the esterification product is a polyester and the functional alcohol is a polyol.

12. The composition of claim 11 wherein the polyol is a hydroxyl substituted alkyl, aryl, alkylaryl, aralkyl, ethylenically-unsaturated, acetylenically-unsaturated, ether, ester, acid, aldehyde, ketone, amide, urea, hydantoin, imide, quaternary ammonium, halogen or amine alcohol.

13. The composition of claim 12 wherein the polyol is a polyhydroxyl substituted hydrocarbon.

14. The composition of claim 13 wherein the esterification product is a diester and the polyol is 2 to 6 carbon glycol.

15. The composition of claim 14 wherein the esterification product is a diester or triester and the polyol is trimethylolpropane.

16. A process for preparing a mixture of esters comprising directly esterifying in the presence of one or more acid esterification catalysts, a mixture of beta-acryloxypropionic acid and higher oligomeric homologues of said acid with polyol.

17. The process of claim 16 wherein the direct esterification is carried out at temperture ranging from about 20° C. to about 200° C.

18. The process of claim 17 wherein the direct esterification is carried out at temperatures ranging from about 50° C. to about 150° C.

19. The process of claim 17 wherein the reaction is carried out at atmospheric, subatmospheric or superatomospheric pressures.

20. The process of claim 17 wherein the acid esterification catalyst is selected from the group consisting of sulfuric acid, hydrocloric acid, phosphoric acid, boric acid, methanesulfonic acid, naphthalenesulfonic acid.

21. The process of claim 16 wherein the esterification catalyst is used at levels of from about 0.1 mole % to about 20 mole %.

22. The process of claim 16 wherein the esterification catalyst is used at levels from about 0.5 mole % to about 10 mole %.

23. The process of claim 16 wherein there is employed vinyl polymerization inhibitor.

24. The process of claim 23 wherein the concentration of vinyl polymerization inhibitor ranges from about 50 ppm to about 10,000 ppm based on the weight of acid substrate.

25. The process of claim 23 wherein the vinyl polymerization inhibitor is selected from the group consisting of hydroquinone, resorcinol, pyrocatechol.

26. The process of claim 23 wherein oxygen or air is sparged through the reaction mixture.

27. The process of claim 16 wherein the direct esterification is carried out in the presence of an inert solvent.

28. The process of claim 27 wherein the inert solvent is present from up to about 90 wt %.

29. The process of claim 27 wherein the inert solvent is selected from the group consisting of benzene, toluene, xylene, chlorobenzene.

30. The process of claim 16 wherein the ratio of acid to alcohol ranges from about 10:1 to 1:10, on an equivalent basis.

31. The process of claim 16 wherein the ratio of acid to alcohol ranges from about 0:1 to about 1:5.

* * * * *